United States Patent [19]

Falco et al.

[11] Patent Number: 5,270,789
[45] Date of Patent: Dec. 14, 1993

[54] WHITE LIGHT INTERFEROMETRIC DEVICE ADAPTED TO DEFINE AN ABSOLUTE REFERENCE POSITION

[75] Inventors: Lucien Falco, Cressier; Guy Voirin, Neuchatel; Olivier Parriaux, Lausanne, all of Switzerland

[73] Assignee: Centre Suisse d'Electronique et de Microtechnique S.A., Switzerland

[21] Appl. No.: 773,437

[22] Filed: Oct. 9, 1991

[30] Foreign Application Priority Data

Oct. 16, 1990 [CH] Switzerland .................. 3308/90

[51] Int. Cl.$^5$ .............................................. G01B 9/02
[52] U.S. Cl. ................................ 356/345; 356/352; 356/358; 356/361
[58] Field of Search ............... 356/345, 346, 351, 352, 356/358, 361, 357

[56] References Cited

U.S. PATENT DOCUMENTS 3,936,193 2/1976 Auth ........................... 356/346

FOREIGN PATENT DOCUMENTS 1405423 10/1990 U.S.S.R. ........................... 356/345

Primary Examiner—Samuel A. Turner
Attorney, Agent, or Firm—Parkhurst, Wendel & Rossi

[57] ABSTRACT

An optical device utilizing white light interferometry, having a Fabry-Perot interferometer incorporated in a reference branch of the optical device. The succession of interference products occurs from a combination of the light traveling through the transmission branch with the light traveling through the reference branch which has undergone 0 to N+1 reflections in the Fabry-Perot interferometer. The interference product gives a series of equally spaced absolute marks.

9 Claims, 2 Drawing Sheets

WHITE LIGHT INTERFEROMETRIC DEVICE ADAPTED TO DEFINE AN ABSOLUTE REFERENCE POSITION

FIELD OF THE INVENTION

The present invention generally relates to devices utilizing optical measuring means, and more particularly, an optical device using white light interferometry.

DISCUSSION OF THE PRIOR ART

The first light sources utilized in interferometry were so-called "white" light sources, characterized by a large spectral width and emitting relatively short coherent wavetrains (substantially incoherent).

The appearance of laser sources (high coherent light) did not necessarily replace white light interferometry in optical path metrometry (measurement of position and/or refractive index).

While interferometry using coherent light permits an incremental, or relative type measurement delivering continuous values, interferometry using white light permits an absolute measurement delivering discrete values.

A major disadvantage of interferometry is the difficulty of permitting an absolute measurement delivering continuous values.

The article "High-accuracy position-sensing with fiber coupled while light interferometers" by Th. Bosselmann and R. Ulrich, 2nd Int. Conf. on Optical Sensor, OFS'84, Stuttgart, September 1984, explains to what extent an interferometric system using white light involves a limitation because of the periodic optical output signal. A known solution resides in the utilization of a modulated light source and of a detection in quadrature, however, the authors note that the absence of a fixed optical zero, that is to say, a reference position, gives rise to a disadvantage. The authors describe an interferometric optical system utilizing a broad-band source, and a first interferometer and a second interferometer which are in accordance with the R.E. Epworth patent referred to hereinbelow.

The Richard E. Epworth U.S. Pat. No. 4,533,247 relates to a transmission optical system utilizing optical means for interferometric measurement.

The Epworth patent shows the connection in series of a first and of a second interferometer of the Michelson, Mach-Zehnder or Fabry-Perot type. The first interferometer is referred to as the measuring interferometer. The two waves in the two branches of the measuring interferometer interfere if the optical path difference in the measuring interferometer is equal to the optical path difference between the two arms of the transducing interferometer.

The Epworth interferometric optical device demands the utilization of means for demodulating the optical signal modulated by the transducing interferometer. The demodulating means is disposed outside the first interferometer, receives a modulated optical signal and must be capable of delivering a demodulated optical signal.

The major disadvantage of the Epworth device is that it demands the reproduction, in the second interferometer, of the transducing effect responsible for the modulation in the first interferometer. This transducing effect, namely a force, a pressure, or a temperature variation, is reflected in a modification of the optogeometric parameters, in this specific case, variation of the optical path of the transducing branch of said interferometer.

The major limitations of such a device reside in the necessity, on the one hand, to reproduce and, on the other hand, to precisely measure the transducing effect in the second interferometer.

Thus, an object of the present invention is to provide an optical device using white light interferometry which does not exhibit the disadvantages and limitations referred to hereinabove.

Another object is to provide an optical device using white light interferometry which delivers at least one reference signal utilized as an origin.

SUMMARY OF THE INVENTION

Advantages of the invention as compared with the prior art include the precision of each reference position due to an incremental interferometric system, the reference positions are independent of the refractive index of air, interference takes place only in a balanced condition and is located on the maximum of the interferogram and the light sources which can be utilized are of low cost and of long service life.

Other objects, features and advantages of the present invention will become evident upon reading the following description of examples of configurations of the optical device using white light interferometry.

BRIEF DESCRIPTION OF THE DRAWINGS

The descriptions are made on a purely illustrative basis and in conjunction with the accompanying drawings, in which.

Optical devices using white light interferometry according to the invention are shown in FIGS. 1 and 2 in accordance with two possible configurations. Throughout the description, the similar elements bear the same reference numbers.

DETAILED DESCRIPTION OF THE FIGURES

Figure 1:
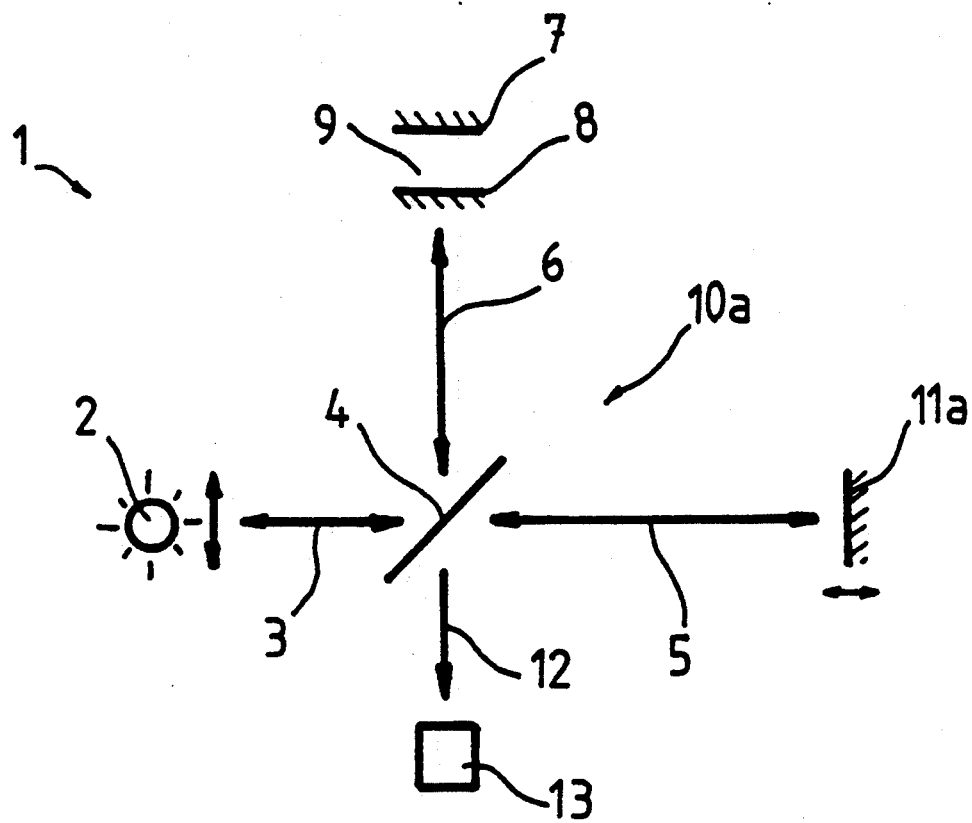
FIG. 1 shows a first configuration of the optical device using white light interferometry.

FIG. 1 shows a first configuration of the interferometric optical device combining a first and a second interferometer of the Michelson and Fabry-Perot type. The interferometric optical device 1 comprises a light source 2 of spectral width $\Delta\lambda$; a first optical interferometer 10a of the Michelson type which is composed of an entrance branch 3, a transmission branch 5 comprising a movable mirror 11a, a reference branch 6 comprising a fixed mirror 7 and an exit branch 12; a second, multiple-wave optical interferometer 9 of the Fabry-Perot type, which is composed of fixed mirror 7 and a second optical mirror 8 which is also fixed and which is disposed in reference branch 6 of the first interferometer; and detecting means 13 disposed in the exit branch of the interferometric device.

Figure 2:
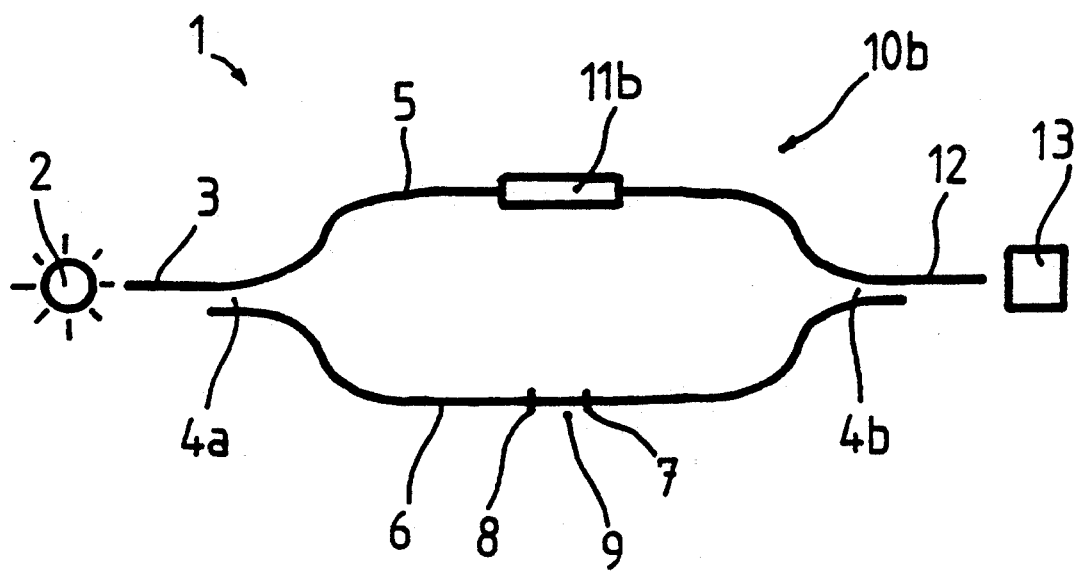
FIG. 2 shows a second configuration of the optical device using white light interferometry.

FIG. 2 shows a second configuration of the interferometric optical device combining a first interferometer and a second interferometer of the Mach-Zehnder and Fabry-Perot type. The interferometric optical device 1 comprises a light source 2 of spectral width $\Delta\lambda$; a first optical interferometer 10b of the Mach-Zehnder type, which is composed of an entrance branch 3, a transmission branch 5 comprising a medium 11b with variable optogeometric parameters, a reference branch 6 and of an exit branch 12; a second, multiple-wave optical interferometer 9 of the Fabry-Perot type, which is composed of a first fixed optical mirror 7 and a second fixed optical mirror 8, which are disposed in the reference branch 6 of the first interferometer; and detecting means 13 disposed in said exit branch 12 of the interferometric device.

In either configuration, the light wave emitted by the source of broad spectral band is injected into the first interferometer. Said injected light wave is divided by amplitude by a first wave separator 4,4a, to produce a reference wave and a transmitted wave for propagation in the reference branch and the transmission branch, respectively.

The reference wave undergoes N successive reflections between the fixed mirrors 7,8 of the second interferometer and is thus broken down into N+1 reference waves. The first one of the N+1 reference waves is that which has not undergone any reflection within the optical cavity of the second interferometer. The last one of the N+1 reference waves being that which has undergone N outward and return passes in said optical cavity. The optical paths travelled by the N+1 reference waves differ from one another by a whole number times the quantity 2nL, n being the refractive index in the optical cavity and L the distance between the fixed mirrors constituting the same.

The transmitted wave propagates in the transmission branch of the first interferometer, the optogeometric parameters of which are capable of being modified under the action of a physical or chemical quantity. The optical path travelled by the transmitted wave which is dependent upon these optogeometric parameters varies as a function of their modifications.

The reference wave and the transmitted wave are recombined, by a second wave separator 4,4b at the exit of the first optical interferometer and are then capable of interfering with one another.

Interference takes place when these two waves travel identical optical paths. In other words, there is a succession of optogeometric modifications, undergone by the transmission branch of the first interferometer, for which modifications the reference wave and the transmitted wave interfere, that is to say, for which there are identical optical paths. This succession is a finite succession of discrete values of optogeometric modifications, since the N+1 reference waves define a finite set of discrete values of the optical path of the reference branch.

The optical cavity of the second interferometer defines as many points of identity of optical paths as there are outward and return passes in the optical cavity plus one. This number of points is limited by the distance between the two mirrors constituting the Fabry-Perot cavity, the greater this distance and the shorter the coherence length of the source, the greater is the number of points which can be defined. In fact, when the coherence length of the source is short, that is to say, when the latter has a broad spectrum, the envelope of the interference product, which is expressed as the Fourrier transform of the spectrum, is short. The closer the points are together, the shorter the Fabry-Perot cavity. In fact, when the Fabry-Perot cavity is short, the distance between points of identify of optical paths will be proportionally shorter.

By way of a nonlimiting example, in the case of the first configuration having optogeometric modifications due to a translation of the movable mirror of the first interferometer, there are successive optical interference positions of the movable mirror. A first interference takes place between the transmitted wave which has not undergone any reflection within the optical cavity of the second interferometer and the reference wave, when the latter propagates in the reference branch of shorter length. On the other hand, interference takes place between the transmitted wave which has performed N outward and return passes within the optical cavity and the reference wave, when the latter propagates in the reference branch of greater length.

Another example is given in the case of the second configuration, this being a configuration in which the optogeometric modifications are reflected in a variation of the refractive index of the transducing optical medium constituting the transmission branch of the first interferometer.

The detecting means disposed at the exit of the interferometric device detects a modulated output signal composed of a succession of interference products. Each interference product, as a function of the difference between optical paths in the reference branch and the transmission branch, is a sequence of fringes spaced apart a distance equal to one half of the central wavelength of the source within an envelope which is the Fourrier transform of the spectral distribution of the light source. The envelopes are, in increasing order of the optical path of the transmission branch, of decreasing amplitude.

The measurement relates to the determination of the position of the various interference products associated with the various optogeometric modifications. The position of one of the interference products permits the definition of an absolute reference position which may be utilized as the origin of an axis.

Furthermore, this determination permits the identification of the physical or chemical quantity responsible for said optogeometric modifications.

Figure 3:
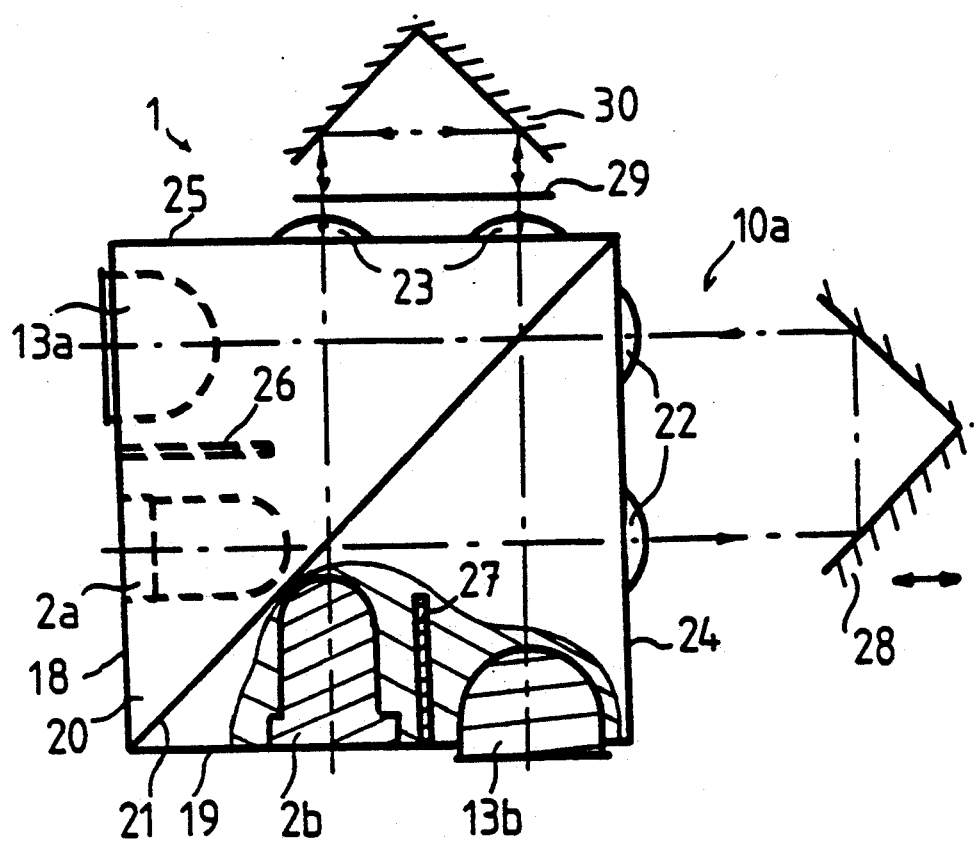
FIG. 3 shows a first illustrative embodiment of the interferometric device according to the first configuration.

In a first preferred embodiment of the invention (FIG. 3) according to the first configuration, the interferometric device 1 principally comprises a first light source 2a and a second light source 2b, a first light receiver 13a and a second light receiver 13b, a separator cube 20, first and second light collimator lenses 22 and 23 respectively, and a first light reflector 28 and a second light reflector 29,30.

The light sources have perpendicular principal emission directions and are disposed on a first face 18 and a second face 19 of a separator cube 20.

The light receivers have principal reception directions which are perpendicular are disposed on the first and said second faces of the separator cube.

The sources and the receivers are thus disposed in such a manner that said principal emission and reception directions form an angle of approximately 45 with the plane of the semitransparent mirror 21 of the separator cube and that the positions of the sources and of the receivers are symmetrical with respect to one another in relation to the plane of said semitransparent mirror of the separator cube.

The first and second light collimator lenses 22 and 23 have perpendicular axes and are disposed on the faces 24, 25 of the separator cube, respectively, which are opposite to the first and second faces of said separator cube.

The first light reflector 28, for example a reflecting prism, is disposed opposite to the first source and the first light receiver. The second light reflector 29,30, for example a semitransparent plane mirror 29 disposed in front of a reflecting prism 30 forming an interferometer of the Fabry-Perot type, is disposed opposite to the second source and to the second light receiver. The waves emitted by the first and second light sources are detected by the first and second light receivers.

The interferometric device may comprise first light obstructing means 26 and second light obstructing means 27, the axes of which are perpendicular. The first and second obstructing means are disposed perpendicularly to said first and second faces of said separator cube, respectively, and between the first source and the first receiver and between the second source and the second receiver, respectively. Each of these obstructing means are, for example, a panel made of a material which absorbs the light and permits each one of the receivers not to be disturbed by the adjacent sources.

In a first variant, the sources are two light-emitting diodes, the respective spectral widths of which are very different. The interference product arising from the diode of narrow spectral width is more spread out than the product arising from the diode of broad spectral width.

In a second variant, the sources are two light-emitting diodes, the respective spectral widths of which are distinct and overlap to a slight extent. The light source thus obtained has a spectral width corresponding to the sum of the spectral widths of the diodes. As the spectral widths of the diodes overlap, the spectrum of the source obtained is continuous and extends from the shortest wavelength to the highest wavelength. In this second variant, one of the receiving means is equipped with an interference filter of passband which is narrow and centered on a wavelength $\lambda_o$ of the spectrum of one of the light sources, preferably close to the emission maximum.

In each one of these variants, the receiving means deliver, on the one hand, a first optical signal characterized by a broad envelope and, on the other hand, a second optical signal of shorter envelope, typically a few microns. The first optical signal permits the determination of the proximity of the various interference products (or interferometrically modified light) and thus the modification of the speed of displacement of the movable mirror. The second optical signal permits the precise determination of the position of the maximum of the interference product.

Figure 4:
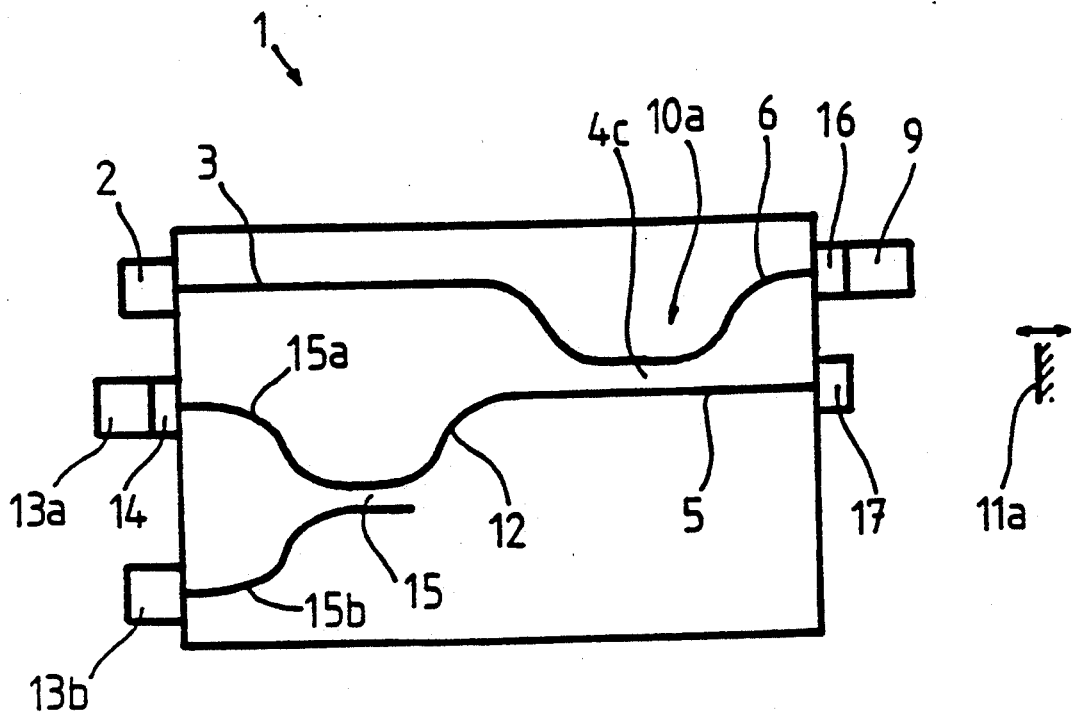
FIG. 4 shows a second illustrative embodiment, using integrated optics, of the interferometric device according to the first configuration.

A second preferred embodiment of the interferometric device of the invention relies upon the techniques of integrated optics. FIG. 4 shows the integrated interferometric device 1, still in accordance with the first configuration.

The interferometric device is integrated on a passive substrate made of glass. The technology of ion exchanges in glasses, which is described by J.-E. Gortych et al., "Fabrication of planar optical waveguides by K+ion exchange in BK7 glass", Optics Letters/Vol. 11, No. 2/February 1986, pp. 100–102, may be utilized. The light source 2 is a light-emitting diode disposed at the edge of the substrate. The light wave is injected into the entrance branch 3. The first interferometer 10a is composed of a broad band coupler 4c, which is alternatively referred to as a 3 dB coupler. The reference branch 6 opens onto a first lens 16 of the Selfoc type which is disposed at the edge of the substrate and which is opposite to the second interferometer 9 of the Fabry-Perot type. The transmission branch 5 opens onto a second lens 17 of the Selfoc type which is disposed at the edge of the substrate and which is opposite to the movable mirror 11a. The exit branch 12 is split into two exit guides 15a,15b via a multiplexing coupler 15.

The two exit guides open onto detecting means, which are composed of two optical detectors 13a,13b. A first detection is performed via an interference filter of passband which is narrow 14 and centered on a wavelength $\lambda_o$ of the spectrum of the light source, preferably close to the emission maximum. This gives successive interference products, the envelope of which corresponds to a source of narrower spectrum than the source actually utilized, and thus of greater coherence length, and thus to an envelope which is more spread out. This first optical signal permits the determination of the proximity of the various interference products and thus the modification of the speed of displacement of the movable mirror, for the purpose of facilitating a second detection. This second detection is performed directly by the second optical detector without the utilization of an interference filter. This gives an optical signal, the envelope of which is fairly short, typically of a few microns. This second optical signal permits the precise determination of the position of the maximum of the interference product.

The optical device using white light interferometry of the invention is utilized, in a first application, for the definition of at least one reference position utilized as the origin which relates to the aforementioned position of the maximum interference product. The origin may be defined as a reference position of the movable mirror. The reflectors or the movable mirror of the first interferometer are/is integral, for example, with an element of a machine tool which moves in translation along an axis and which is desired to determine the linear position by interferometric measurement in monochromatic light in accordance with known methods.

We claim:
1. An optical device using white light interferometry comprising;
light source means for emitting incoherent white light;
first optical means for modulating the emitted light from said light source means, said first optical means comprising a first interferometer which defines:
a) an entrance branch;
b) a reference branch;
c) a transmission branch including means for modifying optogeometric parameters of said first interferometer; and
d) an exit branch;
a second optical means for producing interferences associated with modifications of said optogeometric parameters of said first interferometer comprising a second interferometer located in said reference branch of said first interferometer; and
detecting means for detecting interferometrically modified light exiting from said exit branch and indicative of a specific means for modifying said parameters.

2. The device of claim 1, wherein said first interferometer is a Michelson type interferometer, said reference branch comprises a first fixed mirror, said second interferometer is a multiple wave Fabry-Perot type interferometer comprising said first fixed mirror and a second fixed mirror.

3. The device of claim 1, wherein said first optical interferometer is a Mach-Zehnder type interferometer and said second interferometer is a multiple wave Fabry-Perot interferometer comprising a first fixed mirror and a second fixed mirror.

4. The device of claim 1, wherein said means for modifying said optogeometric parameters of said first interferometer comprises a movable mirror.

5. The device of claim 4, wherein said movable mirror comprises a support which is indexed to identify different mirror positions.

6. The device of claim 1, wherein said means for modifying the optogeometric parameters of said first interferometer comprises a variable light transmission medium.

7. The device of claim 6, wherein a selected light transmission medium has a variable refractive index.

8. The device of claim 1, wherein said detecting means comprises a first detector for detecting fringes of an interferogram with a filter corresponding to a wavelength of a spectrum of said emitted light thereby determining the spacing between each of said fringes characteristic of a specific means for modifying said parameters and a second detector for detecting one of said fringes having a highest relative amplitude thereby determining the position of each of said characteristic fringes.

9. The device of claim 8, wherein said means for modifying said optogeometric parameters of said first interferometer comprises a movable mirror and a plurality of positions, at any one of which positions said mirror may be located, wherein one of said positions corresponds to the fringe having the highest relative amplitude thereby defining a reference position of said movable mirror.

* * * * *